(12) United States Patent
Takigawa et al.

(10) Patent No.: US 7,025,194 B2
(45) Date of Patent: Apr. 11, 2006

(54) ARTICLE MOVING APPARATUS AND DIRECTION CHANGING APPARATUS FOR STICKS

(75) Inventors: Tadashi Takigawa, Ritto (JP); Hiroshi Iwasaki, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 157 days.

(21) Appl. No.: 10/652,490

(22) Filed: Sep. 2, 2003

(65) Prior Publication Data

US 2004/0042891 A1 Mar. 4, 2004

(30) Foreign Application Priority Data

Sep. 2, 2002 (JP) ............................ 2002-257028
Jun. 30, 2003 (JP) ............................ 2003-187751

(51) Int. Cl.
*B65G 47/24* (2006.01)

(52) U.S. Cl. .................................................... 198/408

(58) Field of Classification Search ............... 198/406, 198/408, 469.1, 478.1, 400
See application file for complete search history.

(56) References Cited

U.S. PATENT DOCUMENTS

| | | | |
|---|---|---|---|
| 3,563,377 A * | 2/1971 | Southcott | 198/408 |
| 3,737,050 A * | 6/1973 | Leeuwestein | 198/408 |
| 4,064,016 A | 12/1977 | Vortmann | 198/412 |
| 4,735,761 A * | 4/1988 | Lindenberger | 198/408 |
| 4,928,809 A * | 5/1990 | Bozza | 198/408 |
| 5,277,533 A | 1/1994 | Caridis et al. | 414/21 |
| 5,291,984 A * | 3/1994 | Lusetti | 198/408 |

FOREIGN PATENT DOCUMENTS

| | | |
|---|---|---|
| JP | 1-89330 U | 6/1989 |
| JP | 8-114490 A | 5/1996 |
| WO | WO 00/01601 | 1/2000 |

OTHER PUBLICATIONS

Copy of European Search Report dated Jan. 21, 2005.

\* cited by examiner

*Primary Examiner*—James R. Bidwell
(74) *Attorney, Agent, or Firm*—Staas & Halsey LLP

(57) ABSTRACT

A motor has its rotating shaft fixed by a fixing member so as to be inclined at an angle of θ to the horizontal direction. A supporting member is attached to the rotating shaft of the motor. A plurality of accommodating units are distributed at equal spacing along the circumference, centered on the rotating shaft of the motor, of the supporting member. A pair of peripheral surface members in each of the accommodating units is attached to the fixing member so as to be capable of freely opening and closing by a supporting shaft, and has an approximately square columnar shape in its closed state. An opening at one end of the pair of peripheral surface members having the approximately square columnar shape is opened, and a bottom surface member is arranged on an opening at the other end thereof. Each of the accommodating units is attached to the supporting member such that the supporting shaft is inclined at an angle of α to the rotating shaft of the motor.

15 Claims, 10 Drawing Sheets

F I G. 3
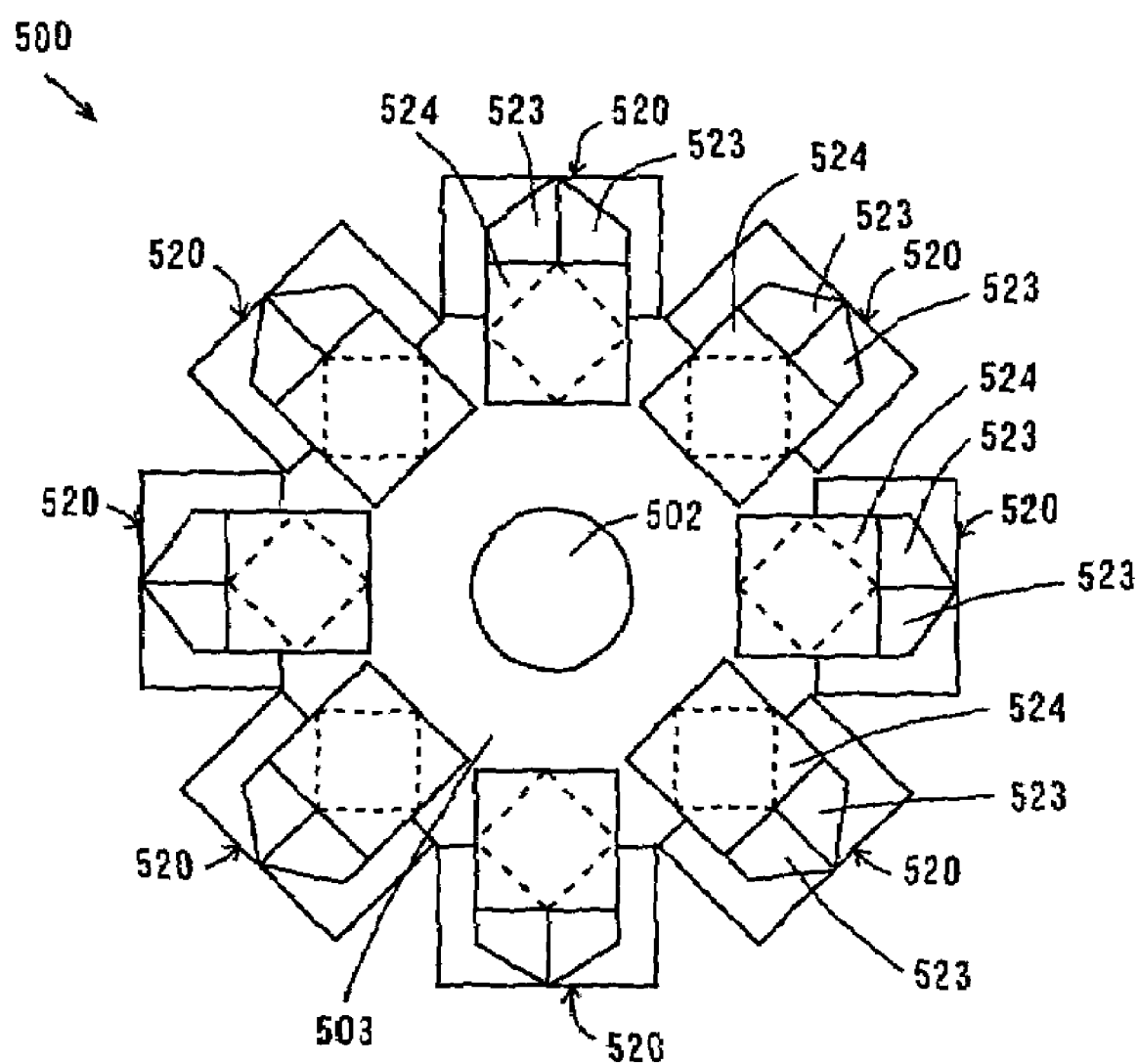

(a)

(b)

ARTICLE MOVING APPARATUS AND DIRECTION CHANGING APPARATUS FOR STICKS

BACKGROUND OF THE INVENTION

1. Field of the Invention

The present invention relates to an article moving apparatus for moving articles and a direction changing apparatus that changes the direction of alignment of sticks.

2. Description of the Background Art

Conventionally, in factories in industries such as food industries, articles such as snacks have been weighed by weighing machines, and the articles having predetermined weights have been shipped after bags have been filled with the articles using bag maker-packaging machines. In order to obtain articles having predetermined weights, combination weighing machines have been used. In the combination weighing machines, articles are distributed and supplied to a plurality of weighing units arranged in a circular shape, and the respective weights of the articles supplied to the plurality of weighing units are combined, thereby making it possible to obtain articles having predetermined weights.

FIG. 9 is a schematic view showing the configuration of a conventional combination weighing machine (see JP, 08-114490, A (1996)). The combination weighing machine 9 shown in FIG. 9 comprises a weighing unit 910 and a collecting chute unit 920.

The weighing unit 910 comprises a circular distribution trough 911, a plurality of radiation troughs 912, a plurality of pool hoppers 913, and a plurality of weighing hoppers 914. An article supply path 901 is arranged above the distribution trough 911. The plurality of radiation troughs 912 are radially arranged around the distribution trough 911. The plurality of pool hoppers 913 are respectively arranged outside and below the plurality of radiation troughs 912. The plurality of weighing hoppers 914 are respectively arranged below the plurality of pool hoppers 913.

The collecting chute unit 920 includes a plurality of upper chute units 921 and a lower chute unit 922. The plurality of upper chute units 921 are respectively arranged below the plurality of weighing hoppers 914. The lower chute unit 922 has an approximately conical shape whose diameter gradually decreases downward from above.

Description is made of the operations of the combination weighing machine 9 shown in FIG. 9. It is herein assumed that articles to be weighed are sticks such as sticky snacks.

First, the sticks to be weighed are continuously supplied to the distribution trough 911 from the article supply path 901. The distribution trough 911 vibrates up and down while lining up the sticks in one direction, and transports the sticks to the plurality of radiation troughs 912. The radiation troughs 912 vibrate up and down, to respectively introduce the sticks into the pool hoppers 913. Gates 913a and 913b of each of the pool hoppers 913 are opened at predetermined timing so that the sticks are introduced into the weighing hopper 914 below the pool hopper 913. Each of the weighing hoppers 914 weighs the sticks introduced from the pool hopper 913.

A combination of the plurality of weighing hoppers 914 is selected such that the sum of the weight values of the sticks 800 respectively weighed by the weighing hoppers 914 is a predetermined target weight value. Respective gates 914a of the selected weighing hoppers 914 are almost simultaneously opened so that the sticks 800 in the selected weighing hoppers 914 are respectively dropped into the upper chute units 921. Consequently, the sticks 800 slide in the upper chute unit 921 and the lower chute unit 922, and are discharged downward from an opening at a lower end of the lower chute unit 922. The discharged sticks 800 are packaged by a bag maker-packaging machine.

Here, the sticks 800 discharged from the lower chute unit 922 are aligned in the vertical direction. Therefore, the sticks 800 are packaged using a vertical pillow type bag maker-packaging machine. In the vertical pillow type bag maker-packaging machine, the sticks 800 are supplied in the longitudinal direction (vertical direction) utilizing gravity, a pillow type (pillow-shaped) bag is formed in the longitudinal direction, and the bag is filled with the supplied sticks 800.

In this case, a film which is a packaging material is curved in a cylindrical shape so that both its sides are sealed to each other in the longitudinal direction, and the cylindrical film is sealed in the transverse direction, thereby forming a bag. The sticks 800 aligned in the vertical direction are introduced into the bag. Thereafter, an opening at an upper end of the bag is sealed in the transverse direction.

When the sticks 800 aligned in the vertical direction are packaged by the vertical pillow type bag maker-packaging machine, the sticks 800 must be introduced into the cylindrical film after the cylindrical film is sealed in the transverse direction. When there occurs a lag between the timing of sealing the cylindrical film in the transverse direction and the timing of introducing the sticks 800 into the cylindrical film, the sticks 800 to be dropped may, in some cases, be meshed with a sealed portion in the transverse direction of the cylindrical film.

Therefore, the direction of alignment of the sticks 800 discharged from the lower chute unit 922 in the combination weighing machine 9 is changed from the vertical direction to the horizontal direction, and the sticks 800 are packaged by a horizontal pillow type bag maker-packaging machine, thereby making it possible to prevent the sticks 800 from being meshed with the sealed portion of the cylindrical film. In this case, a direction changing apparatus for changing the direction of the sticks 800 aligned in the vertical direction to the horizontal direction is required.

FIG. 10 is a schematic view showing the operations of a conventional direction changing apparatus. In the conventional direction changing apparatus, sticks 800 aligned in the vertical direction are accommodated in an accommodating container 950, as shown in FIG. 10(a), and the accommodating container 950 is rotated through an angle of 90 degrees around a shaft 951, as shown in FIG. 10(b), thereby changing the direction of alignment of the sticks 800 to the horizontal direction. After the sticks 800 are discharged from the accommodating container 950, the accommodating container 950 is rotated through an angle of 90 degrees in the opposite direction, thereby returning to the state shown in FIG. 10(a). This operation is repeated to change the direction of alignment of the sticks 800 sequentially supplied.

However, the configuration of such a direction changing apparatus is complicated. Further, the accommodating container 950 must be rotated at low speed in order to prevent a shock from being given to the sticks 800 when the accommodating container 950 is rotated. Therefore, intervals at which the sticks 800 are introduced are lengthened, so that a processing time period is lengthened.

Furthermore, it is also possible to gradually change the direction of alignment of the sticks 800 discharged from a collecting chute (corresponding to the lower chute unit 922 shown in FIG. 9) to the horizontal direction from the vertical direction by sliding the sticks 800 on an inclined sliding path (see JP, 01-089330, U (1989)). In this case, however, the size of the combination weighing machine is increased.

When the articles to be weighed are not sticks such as potato chips, the direction of alignment of the weighed articles which have been discharged from the lower chute unit 922 in the combination weighing machine 9 need not be changed. When a lower end of the lower chute unit 922 in the combination weighing machine 9 and a belt conveyer for conveying the weighed articles to the bag maker-packaging machine are spaced apart from each other, for example, however, the weighed articles which have been discharged from the lower chute unit 922 in the combination weighing machine 9 may be broken or damaged upon receipt of a shock when they are dropped onto the belt conveyer.

Therefore, an article moving apparatus capable of easily moving the weighed articles which have been discharged from the lower chute unit 922 in the combination weighing machine 9 to the belt conveyer in a simple configuration without giving a shock to the weighed articles is desired.

SUMMARY OF THE INVENTION

An object of the present invention is to provide an article moving apparatus that can easily move articles in a simple configuration without giving a shock to the articles.

Another object of the present invention is to provide a direction changing apparatus for sticks that can easily change the direction of alignment of the sticks in a simple configuration.

Still another object of the present invention is to provide a direction changing apparatus for sticks that can easily and quickly change the direction of alignment of the sticks in a simple configuration and can be miniaturized.

An article moving apparatus according to an aspect of the present invention is an article moving apparatus for moving articles, comprising a rotating shaft; a supporting member provided so as to be rotatable around the rotating shaft; at least one accommodating unit provided on the circumference, centered on the rotating shaft, of the supporting member for accommodating the articles; and a rotation driving device for rotating the supporting member around the rotating shaft, the accommodating unit being provided on a supporting shaft inclined to the rotating shaft.

In the article moving apparatus according to the present invention, the supporting member is rotated around the rotating shaft by the rotation driving device. Consequently, the accommodating unit provided on the circumference, centered on the rotating shaft, of the supporting member is rotated within a plane perpendicular to the rotating shaft. The articles are accommodated in the accommodating unit, and are moved as the accommodating unit is rotated. In this case, the accommodating unit is provided on the supporting shaft inclined to the rotating shaft. Therefore, the direction of the accommodating unit is changed as the supporting member is rotated.

In such a way, the articles are accommodated in the accommodating unit, and the accommodating unit is rotated around the rotating shaft, thereby making it possible to easily move the articles in the accommodating unit in a simple configuration without giving a shock to the articles.

The accommodating unit may include a plurality of accommodating units distributed on the circumference, centered on the rotating shaft, of the supporting member.

In this case, the articles in the plurality of accommodating units can be sequentially moved by rotating the supporting member. Therefore, the large number of articles can be quickly moved at short time intervals.

Even if the rotational speed of the supporting member is relatively low, the articles can be quickly moved at short time intervals. Therefore, the articles are not easily broken or damaged during the movement.

Furthermore, the plurality of accommodating units are distributed on the circumference, centered on the rotating shaft, of the supporting member, thereby making it possible to quickly move the large number of articles without increasing the size of the article moving apparatus.

The accommodating unit may have at least one peripheral surface member provided so as to be capable of freely opening and closing with respect to the supporting shaft and forming a cylinder extending along the supporting shaft in its closed state.

In this case, the articles are introduced from an opening at an end of the cylinder in a state where the peripheral surface member is closed, and the peripheral surface member is opened so that the articles in the cylinder can be discharged. Consequently, the articles are introduced from the opening at the end of the cylinder in a state where the peripheral surface member is closed when the accommodating unit is at a predetermined position on the circumference, and the peripheral surface member is opened when the accommodating unit is at another arbitrary position on the circumference so that the articles in the accommodating unit can be discharged.

The accommodating unit may have an opening receiving the articles on a side different from the peripheral surface member.

In this case, the articles are received in the accommodating unit from the opening in a state where the peripheral surface member is closed, and the peripheral surface member is opened so that the articles in the accommodating unit can be discharged.

The article moving apparatus may further comprise an opening and closing device for opening the peripheral surface member when the accommodating unit is at a predetermined position.

In this case, when the accommodating unit is at the predetermined position by the rotation of the supporting member, the peripheral surface member is opened by the opening and closing device, so that the articles in the accommodating unit are discharged. Therefore, the articles in the accommodating unit can be discharged at the arbitrary position by providing the opening and closing device at an arbitrary position.

The peripheral surface member may have a first engaging portion, and the opening and closing device may have a second engaging portion for opening the peripheral surface member by engaging the first engaging portion of the peripheral surface member.

In this case, the second engaging portion of the opening and closing device engages the first engaging portion of the peripheral surface member, thereby making it possible to easily open the peripheral surface member. Therefore, the structure of the opening and closing device is simplified.

The rotating shaft may be inclined at an angle of 45 degrees to the horizontal direction, and the supporting shaft may be inclined at an angle of 45 degrees to the rotating shaft.

In this case, the supporting member is rotated through an angle of 180 degrees, thereby making it possible to move the articles in the accommodating unit obliquely downward or obliquely upward.

The article moving apparatus may further comprise a vibrating device for vibrating the accommodating unit.

In this case, the accommodating unit is vibrated by the vibrating device, thereby making it possible to uniformly distribute the articles in the accommodating unit.

A direction changing apparatus for sticks according to another aspect of the present invention is a direction changing apparatus that changes the direction of alignment of the sticks, comprising a rotating shaft; a supporting member provided so as to be rotatable around the rotating shaft; at least one accommodating unit provided on the circumference, centered on the rotating shaft, of the supporting member; and a rotation driving device for rotating the supporting member around the rotating shaft, the accommodating unit accommodating the sticks while aligning the sticks along a supporting shaft inclined to the rotating shaft.

In the direction changing apparatus for sticks according to the present invention, the supporting member is rotated around the rotating shaft by the rotation driving device. Consequently, the accommodating unit provided on the circumference, centered on the rotating shaft, of the supporting member is rotated within a plane perpendicular to the rotating shaft. The sticks are accommodated while being aligned along the supporting shaft inclined to the rotating shaft by the accommodating unit. Therefore, the direction of alignment of the sticks in the accommodating unit is changed as the accommodating unit is rotated.

In such a way, the accommodating unit is rotated around the rotating shaft, and the sticks are aligned along the supporting shaft inclined to the rotating shaft in the accommodating unit, thereby making it possible to easily change the direction of alignment of the sticks in the accommodating unit in a simple configuration.

The accommodating unit may include a plurality of accommodating units distributed on the circumference, centered on the rotating shaft, of the supporting member.

In this case, the direction of alignment of the sticks in the plurality of accommodating units can be sequentially changed by rotating the supporting member. Therefore, the direction of alignment of the large number of sticks can be quickly changed at short time periods.

Even if the rotational speed of the supporting member is relatively low, the direction of alignment of the sticks can be quickly changed at short time intervals. Therefore, the sticks are not easily broken or damaged.

Furthermore, the plurality of accommodating units are distributed on the circumference, centered on the rotating shaft, of the supporting member, thereby making it possible to quickly change the direction of alignment of the large number of sticks without increasing the size of the direction changing apparatus.

The accommodating unit may have at least one peripheral surface member provided so as to be capable of freely opening and closing with respect to the supporting shaft and forming a cylinder extending along the supporting shaft in its closed state.

In this case, the sticks are introduced from the opening at the end of the cylinder in a state where the peripheral surface member is closed, and the peripheral surface member is opened so that the sticks in the cylinder can be discharged. Consequently, the sticks are introduced from the opening at the end of the cylinder in the state where the peripheral surface member is closed when the accommodating unit is at a predetermined position on the circumference, and the peripheral surface member is opened when the accommodating unit is at another arbitrary position on the circumference so that the introduced sticks can be discharged by changing the direction of alignment of the sticks to an arbitrary direction.

The accommodating unit may have an opening receiving the articles on a side different from the peripheral surface member.

In this case, the articles are received in the accommodating unit from the opening in a state where the peripheral surface member is closed, and the peripheral surface member is opened so that the articles in the accommodating unit can be discharged.

The direction changing apparatus may further comprise an opening and closing device for opening the peripheral surface member when the accommodating unit is at a predetermined position.

In this case, when the accommodating unit is at the predetermined position by the rotation of the supporting member, the peripheral surface member is opened by the opening and closing device, so that the sticks are discharged in a state where they are aligned by the cylinder. Therefore, the sticks can be discharged in a state where they are aligned in an arbitrary direction by providing the opening and closing device at an arbitrary position.

The peripheral surface may have a first engaging portion, and the opening and closing device may have a second engaging portion for opening the peripheral surface member by engaging the first engaging portion of the peripheral surface member.

In this case, the second engaging portion of the opening and closing device engages the first engaging portion of the peripheral surface member, thereby making it possible to easily open the peripheral surface member. Therefore, the structure of the opening and closing device is simplified.

The rotating shaft may be inclined at an angle of 45 degrees to the horizontal direction, and the supporting shaft may be inclined at an angle of 45 degrees to the rotating shaft.

In this case, the supporting member is rotated through an angle of 180 degrees, thereby making it possible to change the direction of alignment of the sticks in the accommodating unit at an angle of 90 degrees.

The direction changing apparatus for sticks may further comprise a vibrating device for vibrating the accommodating unit.

In this case, the accommodating unit is vibrated by the vibrating device, thereby making it possible to reliably align the sticks in the accommodating unit in one direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing the direction changing apparatus shown in FIG. 2 as viewed from a direction indicated by an arrow Z;

DESCRIPTION OF THE PREFERRED EMBODIMENTS

Description is now made of a direction changing apparatus for sticks according to an embodiment of the present invention. The direction changing apparatus for sticks according to the present embodiment can be also used as an article moving apparatus for moving articles, as described later.

Figure 1:
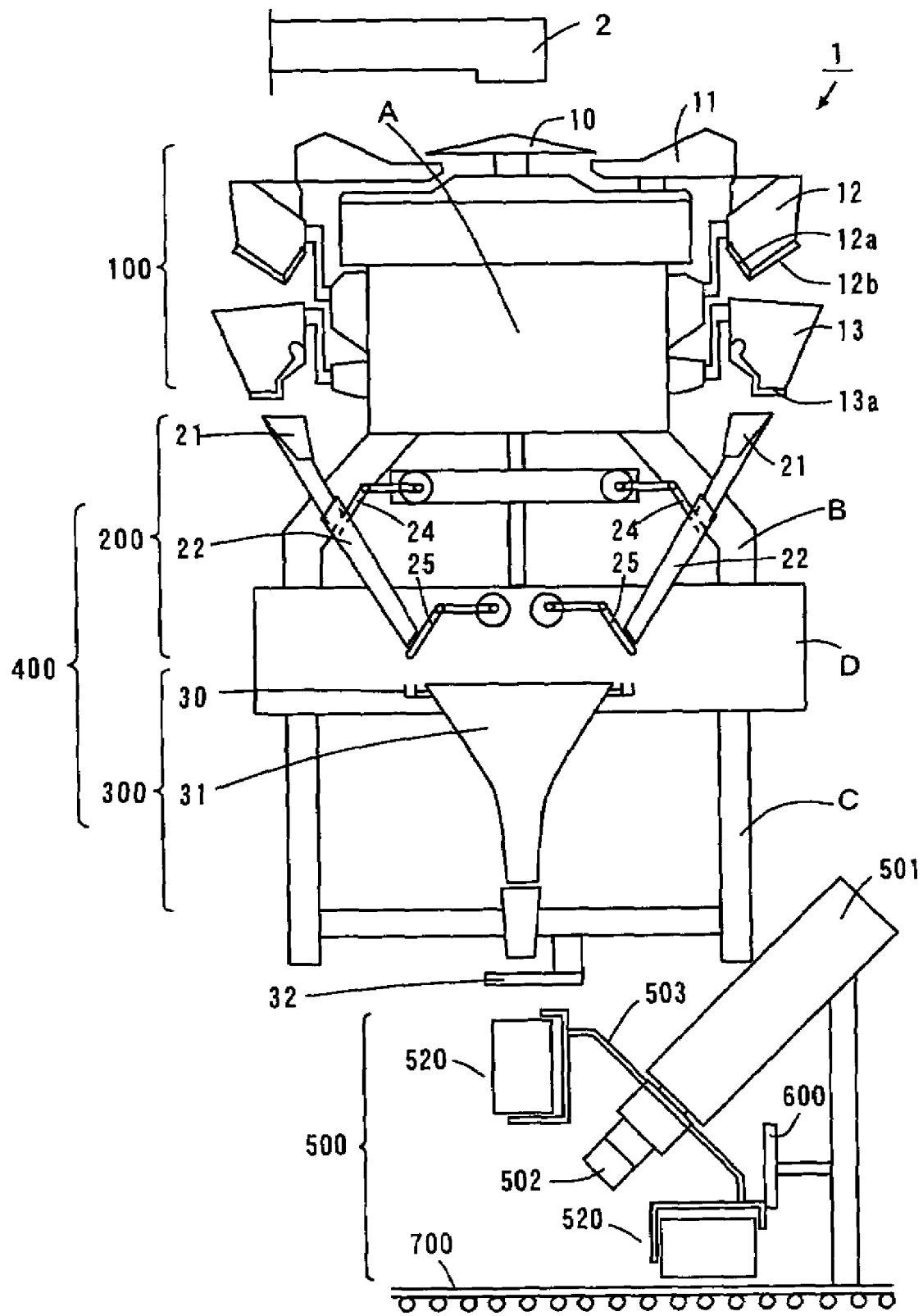
FIG. 1 is a schematic view showing the configuration of a direction changing apparatus according to an embodiment of the present invention and a combination weighing machine.

FIG. 1 is a schematic view showing the configuration of a direction changing apparatus according to an embodiment of the present invention and a combination weighing machine.

The combination weighing machine 1 shown in FIG. 1 comprises a weighing unit 100 and a collecting chute unit 400. The collecting chute unit 400 includes an upper chute unit 200 and a lower chute unit 300. Further, a main body A of the combination weighing machine 1 is supported by a support B, the support B is supported by a stand D, and the stand D is supported by a support C.

The main body A is provided with the weighing unit 100. The weighing unit 100 comprises a circular distribution trough 10, a plurality of radiation troughs 11, a plurality of pool hoppers 12, and a plurality of weighing hoppers 13. An article supply path 2 is arranged above the distribution trough 10. The plurality of radiation troughs 11 are radially arranged around the distribution trough 10. The plurality of pool hoppers 12 are respectively arranged outside and below the plurality of radiation troughs 11. Each of the pool hoppers 12 has gates 12a and 12b provided so as to be capable of freely opening and closing on an opening at its lower end. The plurality of weighing hoppers 13 are respectively arranged below the plurality of pool hoppers 12. Each of the weighing hoppers 13 has a gate 13a provided so as to be capable of freely opening and closing in an opening at its lower end.

The stand D is provided with the upper chute unit 200 and the lower chute unit 300. The upper chute unit 200 comprises a plurality of cake receiving upper chutes 21 and a plurality of upper chutes 22. The plurality of cake receiving upper chutes 21 are respectively arranged below the plurality of weighing hoppers 13. Each of the cake receiving upper chutes 21 has a shutter 24 capable of freely opening and closing provided on an opening at its lower end. The plurality of upper chutes 22 are respectively arranged so as to connect with the plurality of cake receiving upper chutes 21. Each of the upper chutes 22 has a shutter 25 capable of freely opening and closing provided on an opening at its lower end.

The lower chute unit 300 comprises a lower chute 31 and a scrap receiver 30. The lower chute 31 has an approximately conical shape whose diameter gradually decreases downward from above. The scrap receiver 30 is arranged in an annular shape around the lower chute 31. The lower chute 31 has a shutter 32 capable of freely opening and closing provided on its lower part.

A direction changing apparatus for sticks 500 is arranged below the lower chute 31. The configuration of the direction changing apparatus 500 will be described later.

Description is herein made of the operations of the combination weighing machine 1 shown in FIG. 1.

First, sticks to be weighed are continuously supplied to the distribution trough 10 from the article supply path 2. The distribution trough 10 vibrates up and down while lining up the sticks in one direction, to transport the sticks to the plurality of radiation troughs 11. The radiation troughs 11 vibrate up and down, to respectively introduce the sticks into the pool hoppers 12. The gates 12a and 12b of each of the pool hoppers 12 are opened at predetermined timing so that the sticks are introduced into the lower weighing hopper 13. Each of the weighing hoppers 13 weighs the sticks introduced from the pool hopper 12.

A combination of the plurality of weighing hoppers 13 is selected such that the sum of the weight values of the sticks respectively weighed by the weighing hoppers 13 is a predetermined target weight value. The respective gates 13a of the selected weighing hoppers 13 are simultaneously opened so that the sticks in the selected weighing hoppers 13 are respectively dropped into the cake receiving upper chutes 21. Consequently, the sticks respectively slide on the cake receiving upper chutes 21 and the upper chutes 22.

When the shutters 24 and 25 are closed, the stick stops sliding at the shutters 24 and 25. When the shutters 24 and 25 are opened, the stick slides on the cake receiving upper chute 21 and the upper chute 22 in order, and further slides on the lower chute 31, to stop at the shutter 32.

When the shutter 32 is opened, the sticks are introduced into the direction changing apparatus 500 in a state where they are aligned in the vertical direction. The direction of alignment of the sticks is changed from the vertical direction to the horizontal direction by the direction changing apparatus 500. The sticks aligned in the horizontal direction are discharged onto a belt conveyer 700 moving in the horizontal direction, and are transported to a horizontal pillow type bag maker-packaging machine (not shown).

Figure 2:
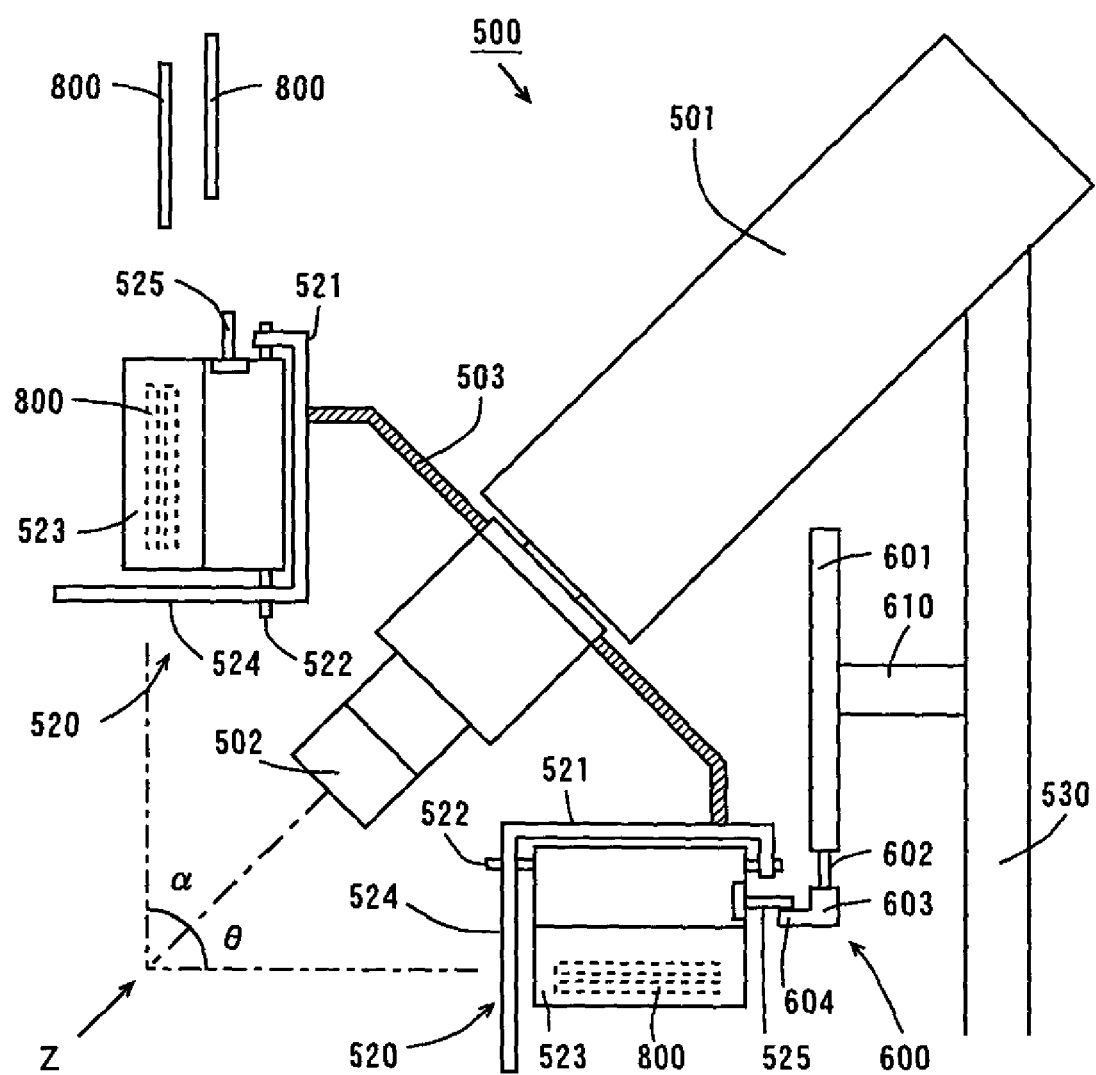
FIG. 2 is a schematic sectional view showing the configuration of the direction changing apparatus shown in FIG. 1.
Figure 4:
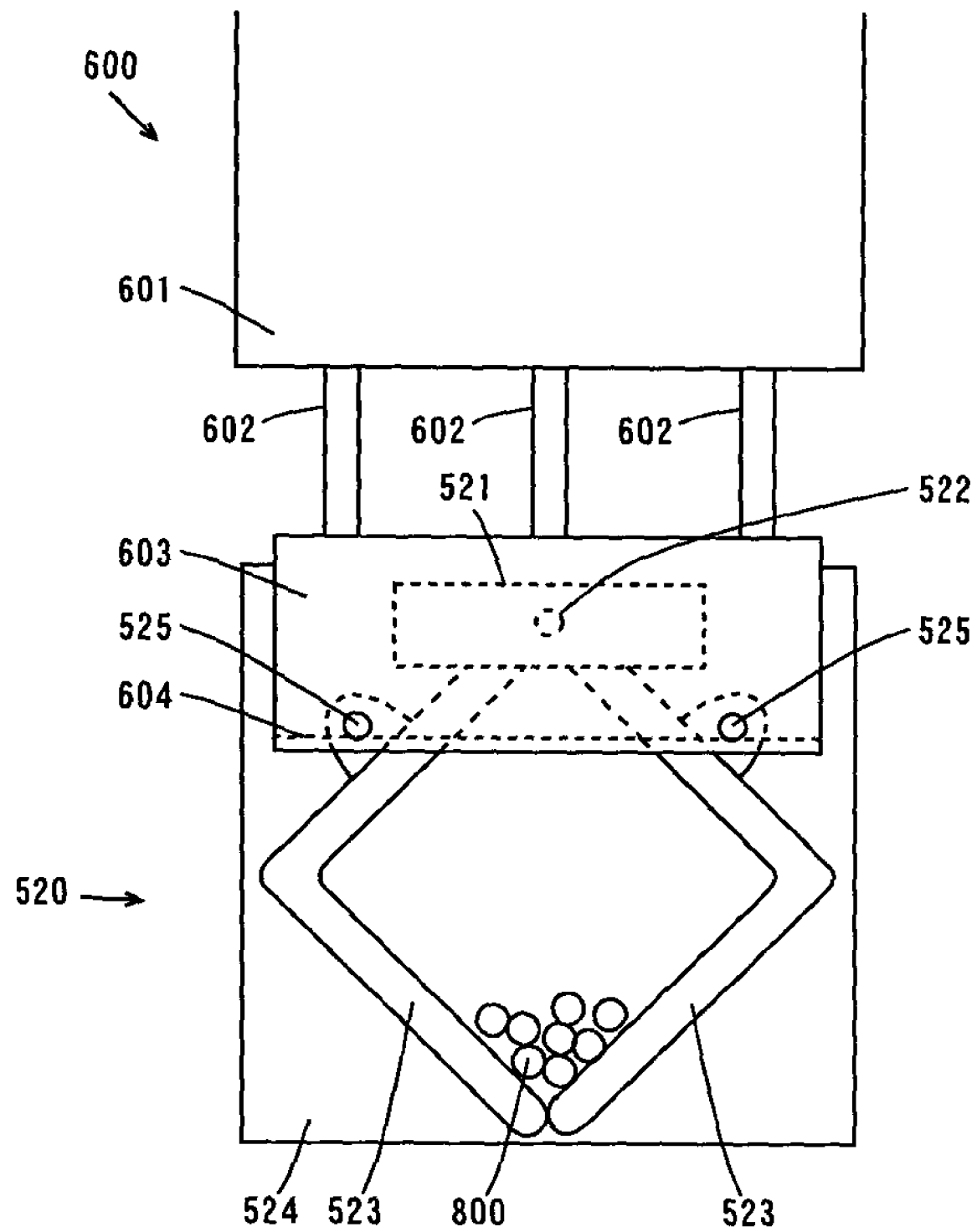
FIG. 4 is a front view showing a state where an accommodating unit in the direction changing apparatus shown in FIG. 2 is closed.
Figure 5:
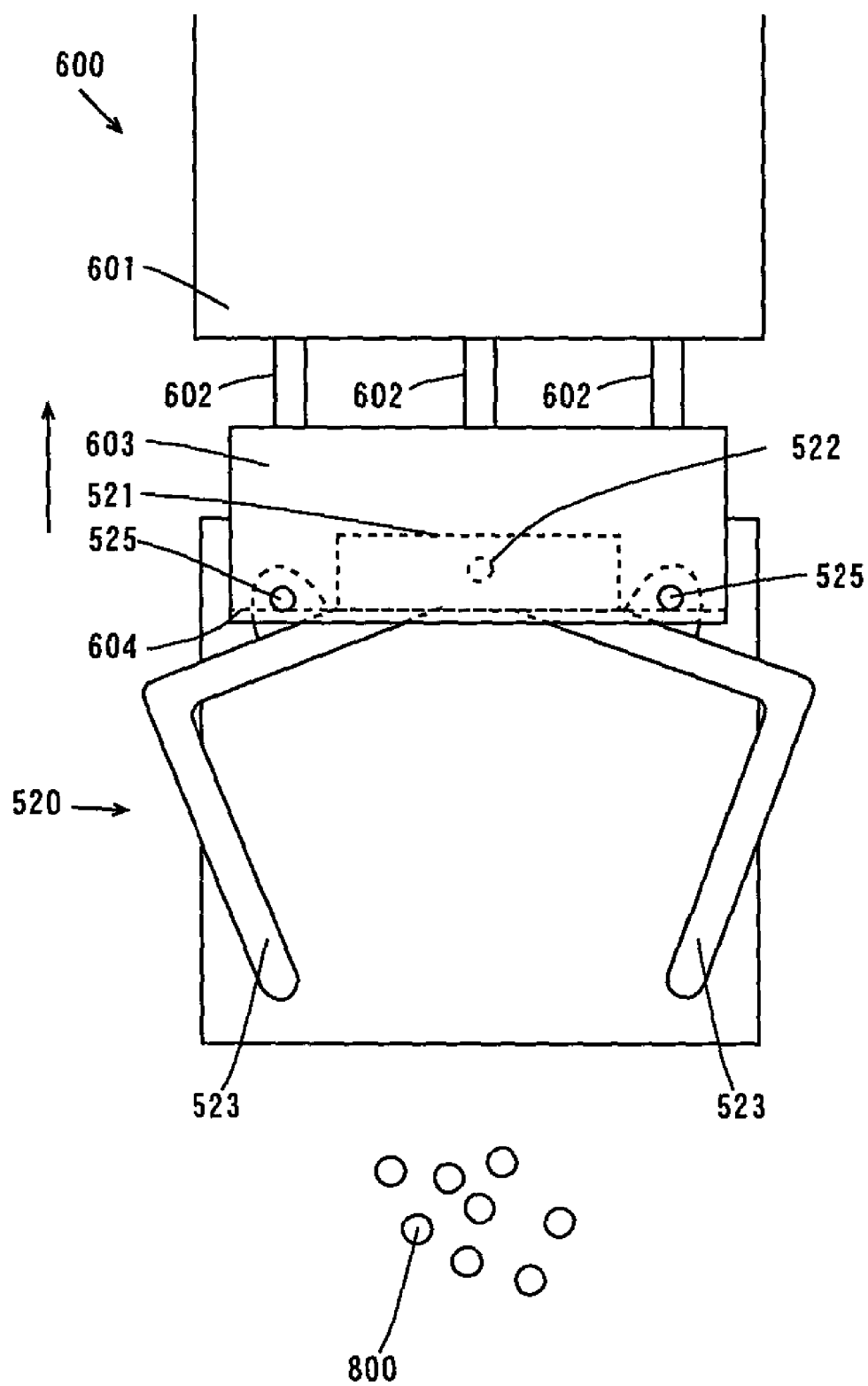
FIG. 5 is a front view showing a state where the accommodating unit in the direction changing apparatus shown in FIG. 2 is opened.

FIG. 2 is a schematic sectional view showing the configuration of the direction changing apparatus 500 shown in FIG. 1, FIG. 3 is a diagram showing the direction changing apparatus 500 shown in FIG. 2 as viewed from a direction indicated by an arrow Z. FIG. 4 is a front view showing a state where an accommodating unit (container) 520 in the direction changing apparatus 500 shown in FIG. 2 is closed, and FIG. 5 is a front view showing a state where the accommodating unit 520 in the direction changing apparatus 500 shown in FIG. 2 is opened.

As shown in FIG. 2, the direction changing apparatus 500 comprises a motor 501, a rotating shaft 502, a disc-shaped supporting member 503, and a plurality of accommodating units (containers) 520. The motor 501 is fixed by a fixing member 530 such that the rotating shaft 502 is inclined at an angle of θ to the horizontal direction. In the present embodiment, the angle θ is 45 degrees.

The supporting member 503 is attached to the rotating shaft 502 of the motor 501. The supporting member 503 is provided with the plurality of accommodating units 520 distributed at equal spacing along its circumference centered on the rotating shaft 502 of the motor 501, as shown in FIG. 3. In the present embodiment, the eight accommodating units 520 are attached to the supporting member 503 at spacing of 45 degrees around the rotating shaft 502 of the motor 501.

Each of the accommodating units 520 shown in FIG. 2 comprises a fixing member 521, a supporting shaft 522, a pair of peripheral surface member 523, a bottom surface member 524, and an engaging member 525 for opening/closing. Each of the peripheral surface member 523 is approximately right-angled triangular in cross section. The pair of peripheral surface member 523 is attached to the fixing member 521 so as to be capable of freely opening and closing by the supporting shaft 522. The pair of peripheral surface member 523 is in an approximately square columnar shape in its closed state. The bottom surface member 524 is integrally formed perpendicularly to the fixing member 521. An opening at one end of the pair of peripheral surface member 523 in an approximately square columnar shape is opened, and the bottom surface member 524 is arranged on an opening at the other end thereof. Each of the accommodating units 520 is attached to the supporting member 503 by the fixing member 521 such that the supporting shaft 522 is inclined at an angle of α to the rotating shaft 502 of the motor 501. In the present embodiment, the angle α is 45 degrees.

In the accommodation unit 520 positioned at the uppermost end of the supporting member 503, the supporting shaft 522 is directed in the vertical direction, the bottom surface member 524 is arranged in the horizontal direction, and the opening at the upper end of the pair of peripheral surface member 523 is opened. Consequently, sticks 800 can be introduced into the accommodating unit 520 from the opening at the upper end. The sticks 800 introduced into the accommodating unit 520 are aligned in the vertical direction.

In the accommodation unit 520 positioned at the lowermost end of the supporting member 503, the supporting shaft 522 is directed in the horizontal direction, and the bottom surface member 524 is arranged in the vertical direction. Consequently, the sticks 800 in the accommodating unit 520 are aligned in the horizontal direction.

When the supporting member 503 is rotated around the rotating shaft 502 by the motor 501, the plurality of accommodating units 520 are rotated within a plane inclined at an angle of 45 degrees to the horizontal direction. Consequently, the direction of the sticks 800 aligned in the vertical direction at the uppermost end of the supporting member 503 can be changed to the horizontal direction at the lowermost end of the supporting member 503 by rotating the supporting member 503 through an angle of 180 degrees.

In this case, the direction of an opening at one end to be an inlet of each of the accommodating units 520 is changed from the upward direction to the sideward direction, and is not changed to the downward direction. Consequently, the sticks 800 accommodated in the accommodating unit 520 are not dropped from the opening at the one end.

As shown in FIG. 2, an opening and closing device 600 is fixed by a supporting member 610 so as to be opposed to the opening at the one end of the accommodating unit 520 at the lowermost end of the supporting member 503. The opening and closing device 600 comprises a driving device 601, a guiding member 602, and a movable member 603. The movable member 603 has an engaging portion 604 which engages the engaging member 525 in the accommodating unit 520. The driving device 601 moves the movable member 603 in the vertical direction through the guiding member 602.

As shown in FIG. 4, when the movable member 603 in the opening and closing device 600 is at its lowermost point, the pair of peripheral surface member 523 in the accommodating unit 520 is closed. Consequently, the sticks 800 are aligned in the horizontal direction inside the peripheral surface member 523.

As shown in FIG. 5, when the movable member 603, together with the engaging portion 604, is raised by the driving device 601 in the opening and closing device 600, the engaging member 525 in the accommodating unit 520 which is engaged by the engaging portion 604 is raised upward, so that the pair of peripheral surface member 523 is opened, centered on the supporting shaft 522. Consequently, the sticks 800 in the peripheral surface member 523 are dropped downward in a state where they are aligned in the horizontal direction.

In the direction changing apparatus 500 according to the present embodiment, the direction of alignment of the sticks 800 in each of the plurality of accommodating units 520 can be changed from the vertical direction to the horizontal direction in a simple configuration by rotating the accommodating unit 520 around the rotating shaft 502 inclined at an angle of 45 degrees to the horizontal direction as well as aligning in the accommodating unit 520 the sticks 800 along the supporting shaft 522 inclined at an angle of 45 degrees to the rotating shaft 502 and radially extending.

The supporting member 503 is provided with the plurality of accommodating units 520, and the sticks 800 can be sequentially introduced into the plurality of accommodating units 520 as the supporting member 503 is rotated. Therefore, the direction of alignment of the large number of sticks 800 can be quickly changed at short time intervals.

Even if the rotational speed of the supporting member 503 is relatively low, the direction of alignment of the sticks 800 can be quickly changed at short time intervals. Therefore, the sticks 800 are not easily broken or damaged.

Furthermore, the plurality of accommodating units 520 are distributed on the circumference, centered on the rotating shaft 502, of the supporting member 503. Therefore, the direction of alignment of the large number of sticks 800 can be quickly changed without increasing the size of the direction changing apparatus 500.

In the direction changing apparatus 500 shown in FIG. 2, the pair of peripheral surface member 523 in the accommodating unit 520 accommodating the defective sticks can be opened to discharge the defective sticks by providing another opening and closing device similar to the opening and closing device 600 at an arbitrary position between the uppermost end and the lowermost end of the supporting member 503. In this case, the timing of opening the accommodating unit 520 by the other opening and closing device is given from the combination weighing machine.

Figure 6:
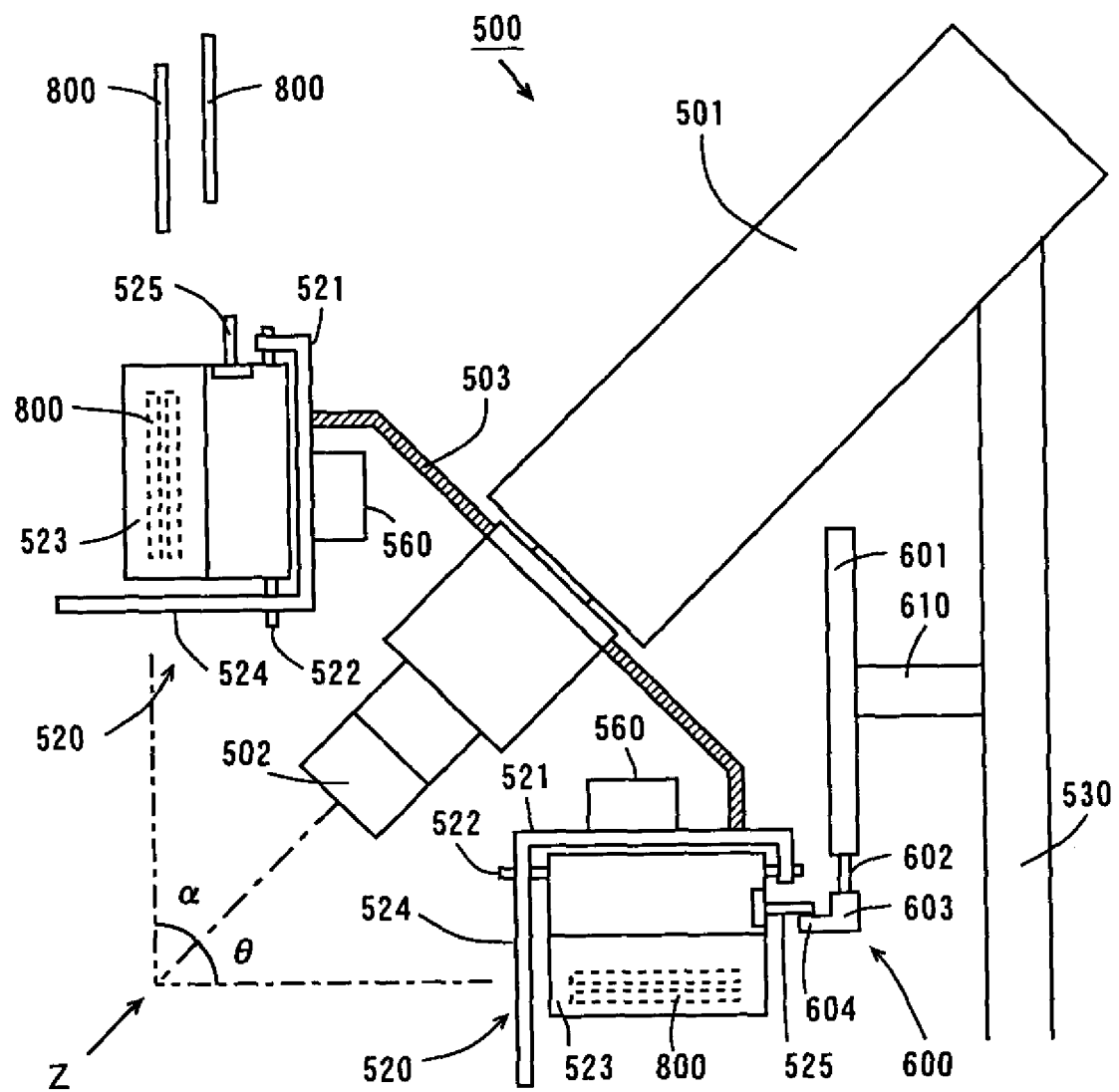
FIG. 6 is a schematic sectional view showing the configuration of a direction changing apparatus according to another embodiment of the present invention.

FIG. 6 is a schematic view showing the configuration of a direction changing apparatus according to another embodiment of the present invention.

The configuration of the direction changing apparatus 500 shown in FIG. 6 is the same as the configuration of the direction changing apparatus 500 shown in FIG. 2 except that a vibrating device 560 is attached to a fixing member 521 in each of accommodating units 520. The vibrating device 560 is composed of an air vibrator, for example.

The vibrating device 560 vibrates by itself, to vibrate a pair of peripheral surface member 523 through the fixing member 521. Consequently, sticks 800 accommodated in the pair of peripheral surface member 523 can be reliably aligned in one direction.

Although in the example shown in FIG. 6, the vibrating device 560 is attached to each of the accommodating units 520, one vibrating device may be provided so as to come into contact with the accommodating unit 520 at a predetermined position. In this case, each of the accommodating units 520 vibrates by coming into contact with the vibrating device when it is at the predetermined position.

Figure 7:
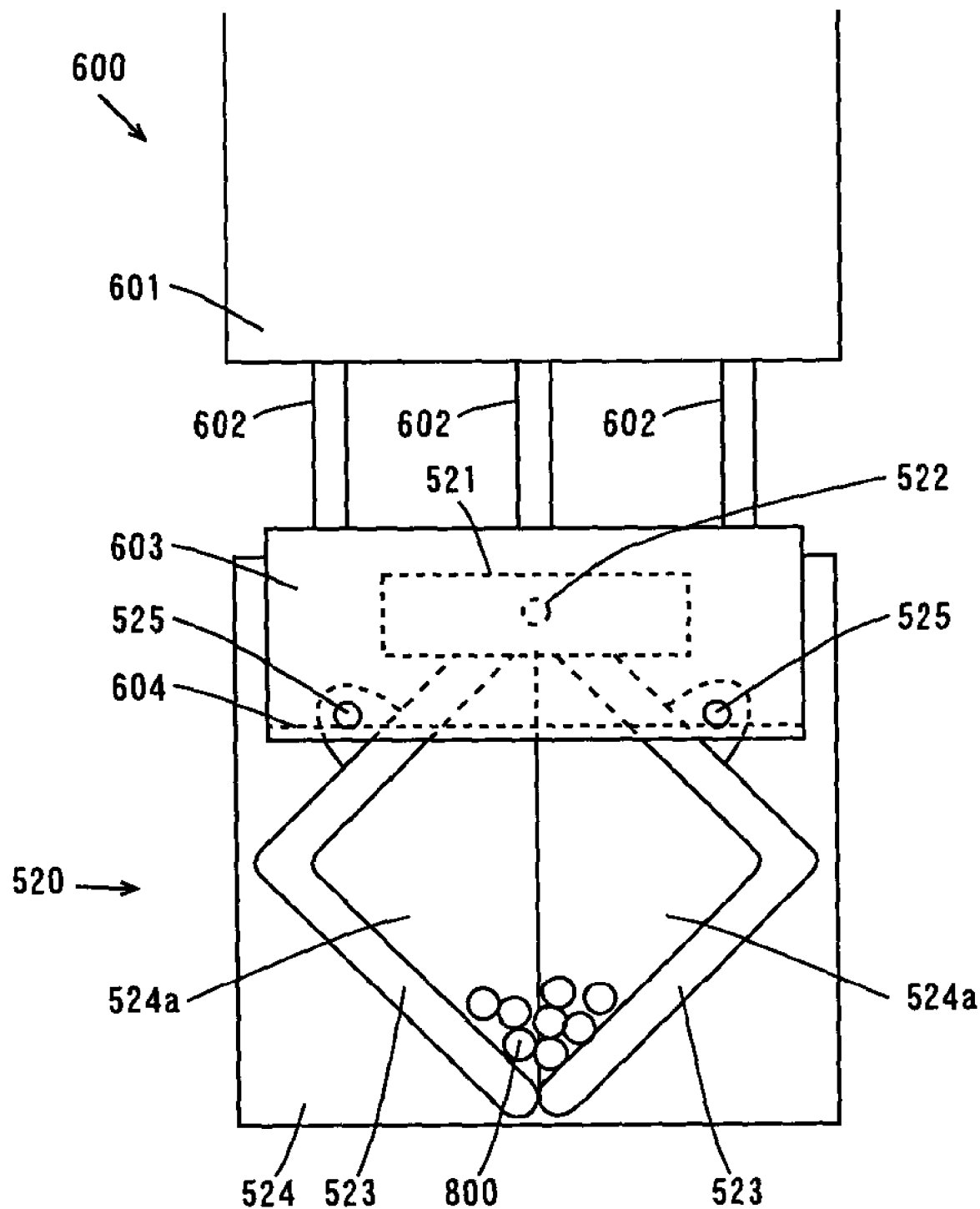
FIG. 7 is a front view showing a state where an accommodating unit in another example is closed.
Figure 8:
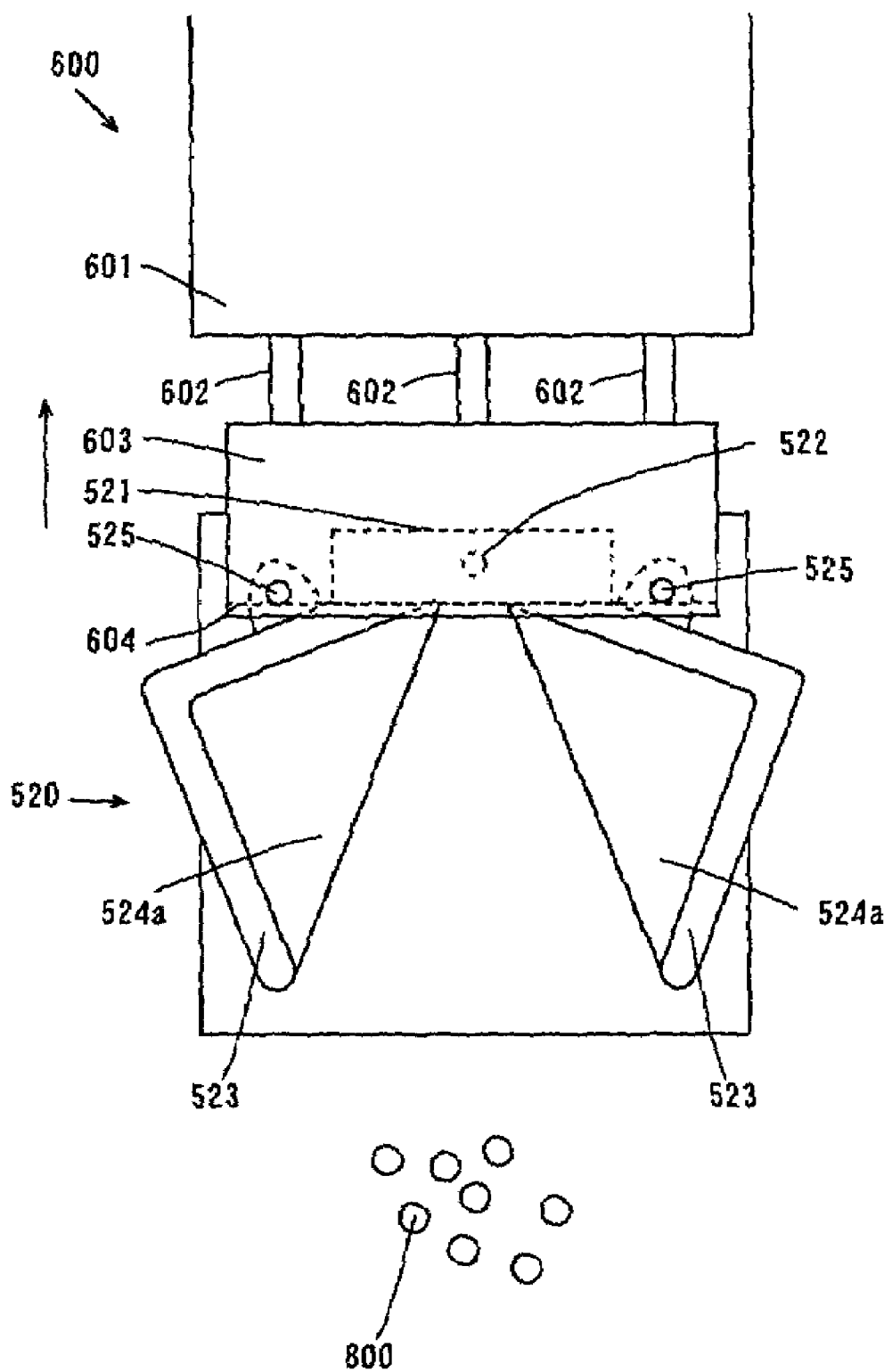
FIG. 8 is a front view showing a state where an accommodating unit in another example is opened.
Figure 9:
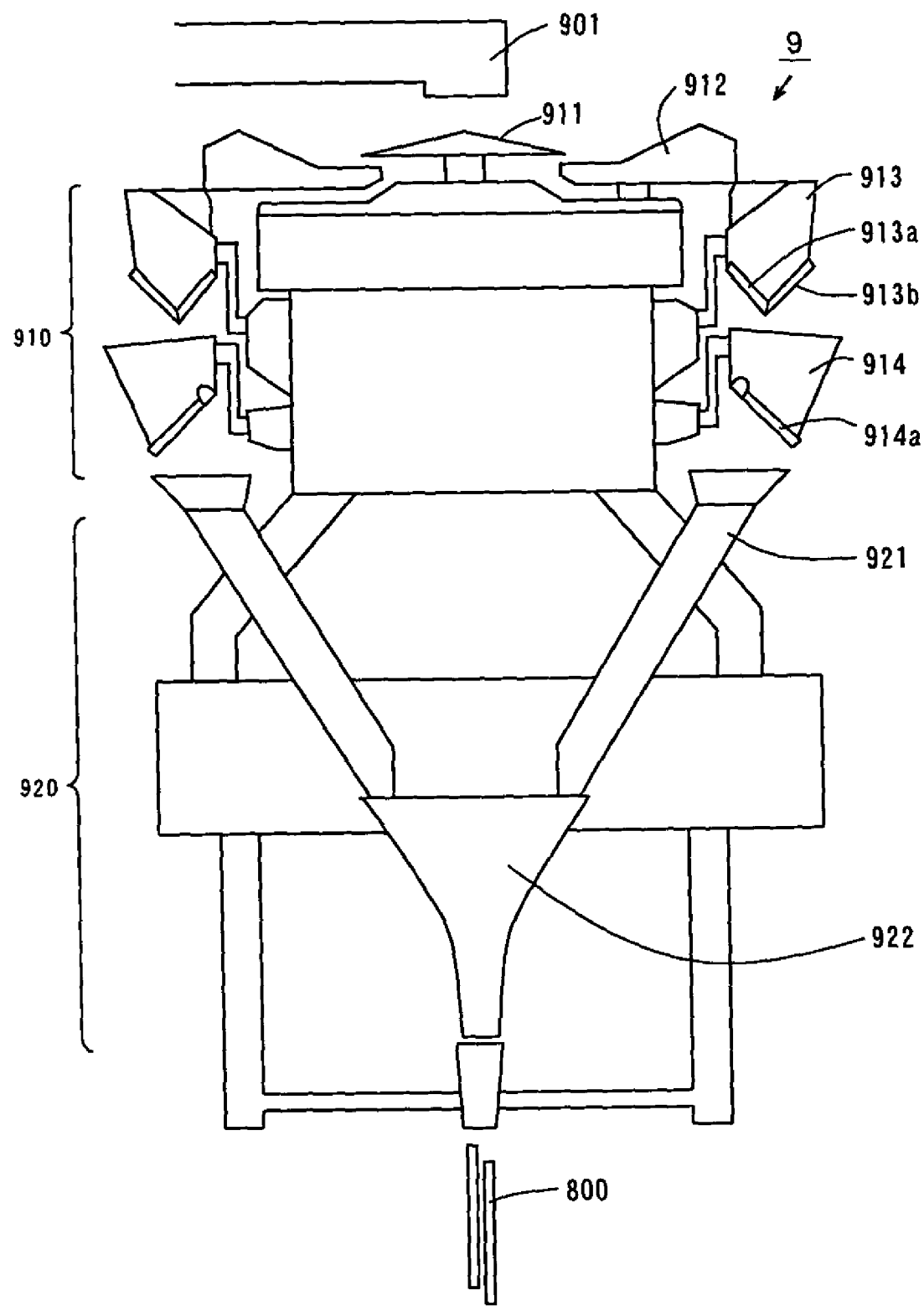
FIG. 9 is a schematic view showing the configuration of a conventional combination weighing machine.
Figure 10:
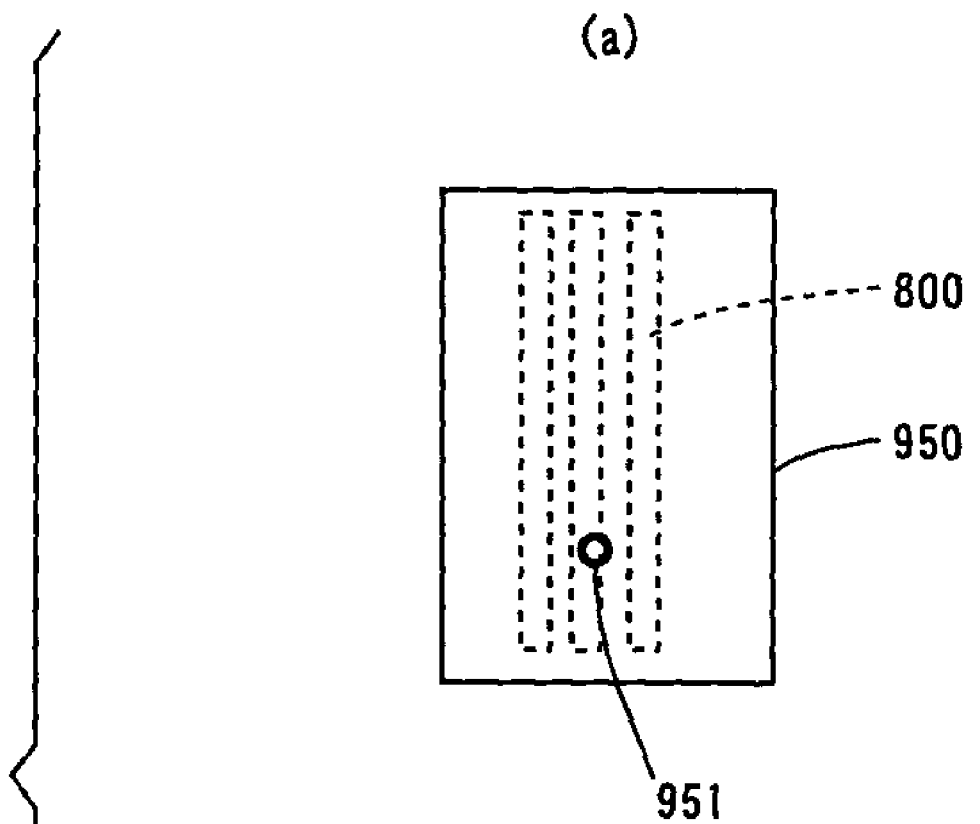
FIG. 10 is a schematic view showing the operations of a conventional direction changing apparatus.
Figure 10:
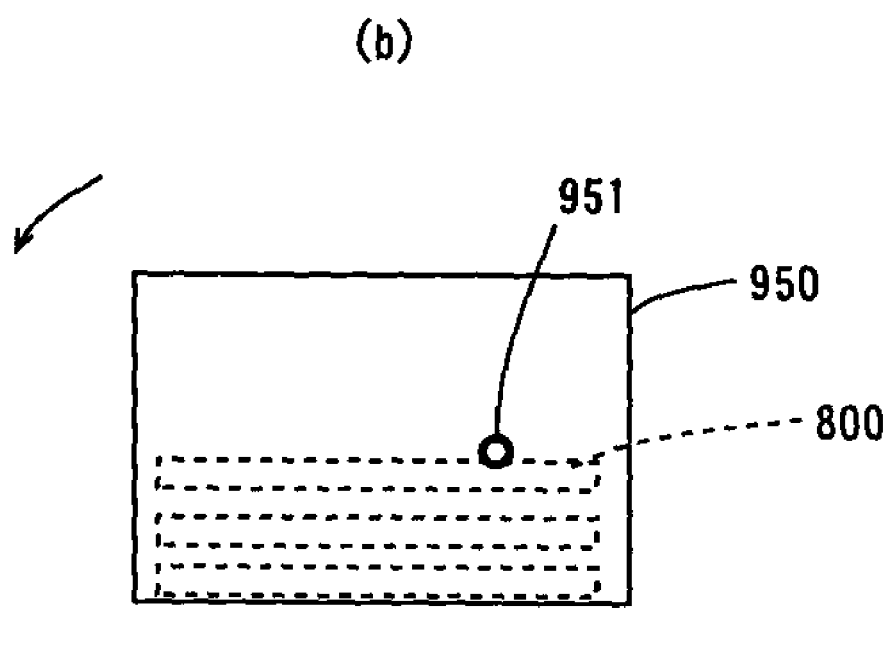

FIGS. 7 and 8 are front views respectively showing states where an accommodating unit 520 in another example is closed and opened.

As shown in FIGS. 7 and 8, openings at respective one ends of peripheral surface member 523, which are approximately right-angled triangular in cross section, in the accommodating unit 520 are opened, and bottom surface members 524a, which are approximately right-angled triangular, are respectively formed integrally with openings at the other ends thereof. In a state where the peripheral surface member 523 are closed, therefore, the openings at the other ends of the peripheral surface member 523 in an approximately square columnar shape enter a closed state by the bottom surface members 524a. The configuration of the accommodating unit 520 shown in FIGS. 7 and 8 is the same as the configuration of the accommodating unit 20 shown in FIGS. 4 and 5 except for the foregoing.

Although in the above-mentioned embodiment, a square column is formed in a state where the pair of peripheral surface member 523 in each of the accommodating units 520 is closed, a circular cylinder may be formed in a state where the pair of peripheral surface member 523 is closed by forming each of the peripheral surface member 523 in a semi-cylindrical shape. Although in the above-mentioned embodiment, each of the peripheral surface member 523 is capable of freely opening and closing, the one peripheral surface member 523 may be fixed, and the other peripheral surface member 523 may be formed so as to be capable of freely opening and closing.

Although in the above-mentioned embodiment, description was made of a case where the direction of alignment of the sticks 800 is changed from the vertical direction to the horizontal direction by the direction changing apparatus 500, the direction of alignment of the sticks 800 can be changed from the horizontal direction to the vertical direction by providing an introducing mechanism for introducing the sticks when the accommodating unit 520 is at the lowermost end of the supporting member 503 and a discharging mechanism for discharging the sticks when the accommodating unit 520 is at the uppermost end of the supporting member 503.

Alternatively, the direction of alignment of the sticks 800 can be changed from an arbitrary direction to an arbitrary direction by providing an introducing mechanism for introducing the sticks into the accommodating unit 520 at an arbitrary position of the supporting member 503 and providing a discharging mechanism for discharging the sticks from the accommodating unit 520 to another arbitrary position of the supporting member 503.

Furthermore, although in the above-mentioned embodiment, the sticks 800 are introduced into the direction changing apparatus 500 from the combination weighing machine 1, the sticks 800 may be supplied to the direction changing apparatus 500 from another weighing machine or another introducing machine in place of the combination weighing machine 1.

The direction changing apparatus 500 shown in FIGS. 1 to 8 can be used as an article moving apparatus when articles to be weighed are not sticks such as potato chips.

In this case, the articles discharged from the lower chute unit 300 in the combination weighing machine 1 are introduced into the accommodating unit 520 at the uppermost end of the supporting member 503 from the opening at the upper end, and the plurality of accommodating units 520 are rotated around the rotating shaft 502 inclined at an angle of 45 degrees to the horizontal direction. Consequently, the articles in each of the accommodating units 520 are moved to the lowermost end of the supporting member 503, and the pair of peripheral surface member 523 is opened so that the articles are discharged onto the belt conveyer 700.

In such a way, the articles in each of the accommodating units 520 can be easily moved in a simple configuration from the uppermost end of the supporting member 503 to the lowermost end of the supporting member 503. Consequently, the articles discharged from the lower chute unit 300 in the combination weighing machine 1 are conveyed onto the belt conveyer 700 without being broken or damaged by a shock.

The supporting member 503 is provided with the plurality of accommodating units 520, and the articles can be sequentially introduced into the plurality of accommodating units 520 as the supporting member 503 is rotated. Therefore, the large number of articles can be quickly moved at short time intervals.

Even if the rotational speed of the supporting member 503 is relatively low, the articles can be quickly moved at short time intervals. Therefore, the articles are not easily broken or damaged during the movement.

Furthermore, the plurality of accommodating units 520 are distributed on the circumference, centered on the rotating shaft 502, of the supporting member 503. Therefore, the large number of articles can be quickly moved without increasing the size of the article moving apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An article moving apparatus for moving articles, comprising:
    a rotating shaft;
    a supporting member provided so as to be rotatable around said rotating shaft and having a supporting shaft inclined to said rotating shaft;
    an accommodating unit provided on said supporting shaft for accommodating said articles so as to surround the articles; and
    a rotation driving device for rotating said supporting member around said rotating shaft,
    wherein said accommodating unit has at least one peripheral surface member provided so as to be capable of freely opening and closing with respect to said supporting shaft and forming a cylinder extending along said supporting shaft in a closed state.

2. The article moving apparatus according to claim 1, wherein
    said accommodating unit includes a plurality of accommodating units arranged so as to be equally distant from said rotating shaft.

3. The article moving apparatus according to claim 1, wherein
    said accommodating unit has an opening receiving the articles on a side different from said peripheral surface member.

4. The article moving apparatus according to claim 1, further comprising
an opening and closing device for opening said peripheral surface member when said accommodating unit is at a predetermined position.

5. The article moving apparatus according to claim 4, wherein
said peripheral surface member has a first engaging portion, and
said opening and closing device has a second engaging portion for opening said peripheral surface member by engaging said first engaging portion of said peripheral surface member.

6. The article moving apparatus according to claim 1, wherein
said rotating shaft is inclined at an angle of 45 degrees to the horizontal direction, and
said supporting shaft is inclined at an angle of 45 degrees to said rotating shaft.

7. An article moving apparatus for moving articles, comprising:
a rotating shaft;
a supporting member provided so as to be rotatable around said rotating shaft and having a supporting shaft inclined to said rotating shaft;
an accommodating unit provided on said supporting shaft for accommodating said articles so as to surround the articles;
a rotation driving device for rotating said supporting member around said rotating shaft; and
a vibrating device for vibrating said accommodating unit.

8. A direction changing apparatus for sticks that changes the direction of alignment of the sticks, comprising:
a rotating shaft;
a supporting member provided so as to be rotatable around said rotating shaft and having a supporting shaft inclined to said rotating shaft;
an accommodating unit provided on said supporting shaft; and
a rotation driving device for rotating said supporting member around said rotating shaft,
wherein said accommodating unit accommodates the sticks so as to surround the sticks while aligning the sticks along said supporting shaft, and has at least one peripheral surface member provided so as to be capable of freely opening and closing with respect to said supporting shaft and forming a cylinder extending along said supporting shaft in a closed state.

9. The direction changing apparatus for sticks according to claim 8, wherein
said accommodating unit includes a plurality of accommodating units arranged so as to be equally distant from said rotating shaft.

10. The direction changing apparatus for sticks according to claim 8, wherein
said accommodating unit has an opening receiving the sticks on a side different from said peripheral surface member.

11. The direction changing apparatus for sticks according to claim 8, further comprising
an opening and closing device for opening said peripheral surface member when said accommodating unit is at a predetermined position.

12. The direction changing apparatus for sticks according to claim 11, wherein
said peripheral surface member has a first engaging portion, and
said opening and closing device has a second engaging portion for opening said peripheral surface member by engaging said first engaging portion of said peripheral surface member.

13. The direction changing apparatus for sticks according to claim 8, wherein
said rotating shaft is inclined at an angle of 45 degrees to the horizontal direction, and
said supporting shaft is inclined at an angle of 45 degrees to said rotating shaft.

14. A direction changing apparatus for sticks that changes the direction of alignment of the sticks, comprising:
a rotating shaft;
a supporting member provided so as to be rotatable around said rotating shaft and having a supporting shaft inclined to said rotating shaft;
an accommodating unit provided on said supporting shaft;
a rotation driving device for rotating said supporting member around said rotating shaft; and
a vibrating device for vibrating said accommodating unit,
wherein said accommodating unit accommodates the sticks so as to surround the sticks while aligning the sticks along said supporting shaft.

15. An article moving apparatus for moving articles, comprising:
a rotating shaft;
a supporting member provided so as to be rotatable around said rotating shaft and having a supporting shaft inclined to said rotating shaft;
an accommodating unit provided on said supporting shaft for accommodating said articles so as to surround the articles; and
a rotation driving device for rotating said supporting member around said rotating shaft,
wherein the articles are elongated articles and the rotating shaft, the supporting member, the accommodating unit and the rotation driving device are arranged with respect to each other so that rotation of the supporting member around the rotating shaft by the rotation driving device causes the elongated articles accommodated by the accommodating unit to be conveyed from a first position in which the elongated articles are vertically aligned to a second position at a different location than the first position and in which the elongated articles are horizontally aligned.

* * * * *